(12) United States Patent
Rozen et al.

(10) Patent No.: US 12,106,363 B2
(45) Date of Patent: Oct. 1, 2024

(54) SYSTEMS AND METHODS FOR AUTOMATED ACCOUNT MIGRATION

(71) Applicant: JPMORGAN CHASE BANK, N.A., New York, NY (US)

(72) Inventors: Matthew Rozen, Phoenix, AZ (US); Simon Bernard Abtalion, Warren, NJ (US); Steve Tomczyk, New York, NY (US); Vera E Skalka, Johns Creek, GA (US); Melanie Beatus, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 209 days.

(21) Appl. No.: 17/404,848

(22) Filed: Aug. 17, 2021

(65) Prior Publication Data

US 2023/0059843 A1 Feb. 23, 2023

(51) Int. Cl.
*G06Q 40/02* (2023.01)
*G06Q 20/02* (2012.01)
*G06Q 20/40* (2012.01)

(52) U.S. Cl.
CPC .......... *G06Q 40/02* (2013.01); *G06Q 20/023* (2013.01); *G06Q 20/40* (2013.01)

(58) Field of Classification Search
CPC ....... G06Q 40/02; G06Q 20/023; G06Q 20/40
USPC ......................................................... 705/44
See application file for complete search history.

(56) References Cited

U.S. PATENT DOCUMENTS

| | | | |
|---|---|---|---|
| 8,001,045 B1 * | 8/2011 | McClinton | G06Q 40/02 705/40 |
| 10,909,618 B1 * | 2/2021 | Mortensen | G06Q 40/02 |
| 2006/0116949 A1 * | 6/2006 | Wehunt | G06Q 40/02 705/35 |
| 2008/0301037 A1 * | 12/2008 | Monk | G06Q 40/00 705/38 |
| 2014/0229203 A1 * | 8/2014 | Dean | G06Q 40/08 705/4 |
| 2015/0142650 A1 * | 5/2015 | Johnston | G06Q 20/102 705/41 |
| 2018/0349882 A1 * | 12/2018 | White, III | G06Q 20/227 |
| 2021/0027296 A1 * | 1/2021 | Mullaney | G06Q 20/24 |

* cited by examiner

*Primary Examiner* — Lindsay M Maguire
(74) *Attorney, Agent, or Firm* — GREENBERG TRAURIG LLP

(57) ABSTRACT

In one embodiment, a method for automated account migration may include a migration computer program. The migration computer program may execute steps including receiving an AR file comprising one or more incoming payments from a client; identifying a payor for each incoming payment, each payor having a payor record; enriching the payor record with payor information from a third-party database; identifying a client of the financial institution in a client database that is potentially the payor, the client database comprising a plurality of client records; generating a confidence score for the client using a scoring engine; associating the payor with the client in response to the confidence score being above a threshold; identifying an optimal payment mechanism for payment for a payor account to an account for the client with the financial institution; and implementing the optimal payment mechanism.

16 Claims, 2 Drawing Sheets

SYSTEMS AND METHODS FOR AUTOMATED ACCOUNT MIGRATION

BACKGROUND OF THE INVENTION

1. Field of the Invention

Embodiments relate to systems and methods for automated account migration.

2. Description of the Related Art

Changing banks is a resource-intensive process. For example, it may involve updating the remit to address for account receivables, which is a slow process and makes it less attractive for a client to switch banks.

SUMMARY OF THE INVENTION

Systems and methods for automated account migration are disclosed. In one embodiment, a method for automated account migration may include: (1) receiving, by a migration computer program executed by a backend for a financial institution comprising a computer processor, an AR file comprising one or more incoming payments from a client; (2) identifying, by the migration computer program, a payor for each incoming payment, each payor having a payor record; (3) enriching, by the migration computer program, the payor record with payor information from a third-party database; (4) identifying, by the migration computer program, a client of the financial institution in a client database that is potentially the payor, the client database comprising a plurality of client records; (5) generating, by the migration computer program, a confidence score for the client using a scoring engine; (6) associating, by the migration computer program, the payor with the client in response to the confidence score being above a threshold; (7) identifying, by the migration computer program, an optimal payment mechanism for payment for a payor account to an account for the client with the financial institution; and (8) implementing, by the migration computer program, the optimal payment mechanism.

In one embodiment, the step of enriching the payor record with payor information from the third-party database may include: identifying, by the migration computer program, the payor in the third-party database; retrieving, by the migration computer program, payor information for the payor from the third-party database; and updating, by the migration computer program, the payor record with at least some of the payor information.

In one embodiment, the third-party database may include a commercial database.

In one embodiment, the step of generating the confidence score for the client may include: identifying, by the scoring engine, a match or a non-match to each payor data field in the payor record to client data field in one of the client records; assigning, by the scoring engine, a score to the match or the non-match; assigning, by the scoring engine, a weight to each score; weighting, by the scoring engine, the scores using the weights; and calculating, by the scoring engine, the confidence score based on the weighted scores.

In one embodiment, the weightings may be set based on historical data.

In one embodiment, the threshold may be set using a machine learning engine.

In one embodiment, the step of identifying the optimal payment mechanism for payment for the payor account to the account for the client with the financial institution may include requesting, by the migration computer program, authorization from the payor for the optimal payment mechanism.

In one embodiment, the method may further include executing, by the migration computer program, an ACH intercept for an ACH payment from the payor to a former financial institution for the client.

In one embodiment, the third-party database may include a third-party financial institution database in a financial institution network.

In one embodiment, the step of implementing, by the migration computer program, the optimal payment mechanism may include communicating, by the migration computer program and over a banking network, the optimal payment mechanism to the payor.

According to another embodiment, a backend electronic device for a financial institution may include a memory storing a migration computer program and a computer processor. When executed by the computer processor, the migration computer program may cause the computer processor to: receive an AR file comprising one or more incoming payments from a client; identify a payor for each incoming payment, each payor having a payor record; enrich the payor record with payor information from a third-party database; identify a client of the financial institution in a client database that is potentially the payor, the client database comprising a plurality of client records; generate a confidence score for the client using a scoring engine; associate the payor with the client in response to the confidence score being above a threshold; identify an optimal payment mechanism for payment for a payor account to an account for the client with the financial institution; and implement the optimal payment mechanism.

In one embodiment, the migration computer program may enrich the payor record with payor information from the third-party database by causing the computer processor to: identify the payor in the third-party database; retrieve payor information for the payor from the third-party database; and update the payor record with at least some of the payor information.

In one embodiment, the third-party database may include a commercial database.

In one embodiment, the migration computer program may generate the confidence score for the client by causing the computer processor to: identify a match or a non-match to each payor data field in the payor record to client data field in one of the client records; assign a score to the match or the non-match; assign a weight to each score; weight the scores using the weights; and calculate the confidence score based on the weighted scores.

In one embodiment, the weightings may be set based on historical data.

In one embodiment, the threshold may be set using a machine learning engine.

In one embodiment, the migration computer program may identify the optimal payment mechanism for payment for the payor account to the account for the client with the financial institution by causing the computer processor to request authorization from the payor for the optimal payment mechanism.

In one embodiment, the migration computer program may further cause the computer processor to execute an ACH intercept for an ACH payment from the payor to a former financial institution for the client.

In one embodiment, the third-party database may include a third-party financial institution database in a financial institution network.

In one embodiment, the migration computer program may implement the optimal payment mechanism by causing the computer processor to communicate, over a banking network, the optimal payment mechanism to the payor.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Embodiments are generally directed to systems and methods for automated account migration. Embodiments may review a client's account receivable files and use artificial intelligence and machine learning to identify existing relationships with a payor that will expedite the account migration. In embodiments, client may move their accounts receivable (AR) based on a financial institution's ability to successfully predict a payment type a particular vendor is likely to accept, while prioritizing automation, working capital, and rebate generation. In embodiments, artificial intelligence may be used to process the AR file to identify payment mechanisms for the payors in the AR file. Embodiments may result in an increase of "on-us payments," books transfers versus check payments, the use of other payment rails, etc., while improving the availability of funds and reducing the cost of dollars collected.

Embodiments may provide at least some of the following advantages: (1) increased speed/reduced friction; (2) the use of portfolio analytics to identify payors that would have the greatest clearing benefit; (3) reduced cost; (4) the generation of a single searchable database to identify customers using, for example, an AR file, and enrichment of that data using third party sources; and (5) the use of a self-service user interface to match entities in the AR file to current customers.

Figure 1:
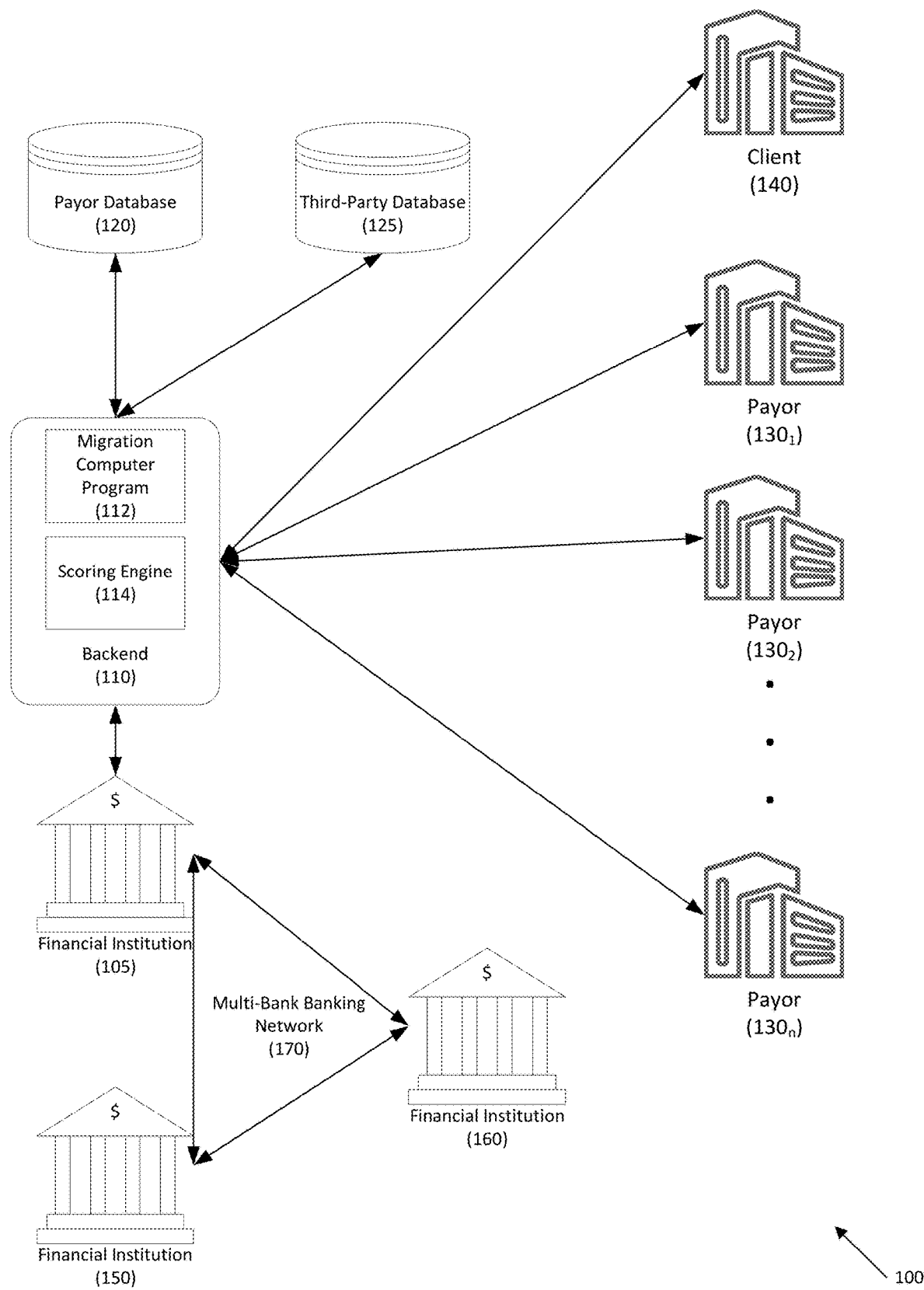
FIG. 1 illustrates a system for automated account migration according to one embodiment.

Referring to FIG. 1, a system for automated account migration is disclosed according to an embodiment. System 100 may include backend 110 that may execute migration computer program 112. In one embodiment, backend 110 may be any suitable computing device including, for example, servers (e.g., cloud-based, physical, combinations thereof, etc.). Backend 110 may be associated with financial institution 105.

Migration computer program 112 may access payor database 120, which may identify a plurality of payors for a financial institution.

Backend 110 may further execute scoring engine 114, which may be a program that scores a likelihood of a payor match.

System 100 may further include a plurality of payors 1301, 1302, . . . 130$_n$. Payors 130 may be customers of financial institution 105 that may have accounts with financial institution 105. Alternatively, payors 130 may customers of a different financial institution.

In one embodiment, a plurality of financial institutions, such as financial institution 105, financial institution 150, financial institution 160, etc. may be provided, and each financial institution may participate in multi-bank banking network 170, such as the Liink network.

Client 140 may be a customer of financial institution 105 that may transfer its AR file to financial institution 105. In one embodiment, client 140 may be a new client of financial institution 105. Client 140 may be a provider of a good or service, such as a merchant, a health care provider, etc.

In one embodiment, client 140 may acquire an AR file from an acquired client (not shown).

System 100 may further include one or more third-party database 125 that may provide information about payors 130. Examples of third-party databases 125 include Dun and Bradstreet, Moody's, etc. Third-party databases 125 may further include external accounting systems, billing systems, etc.

Figure 2:
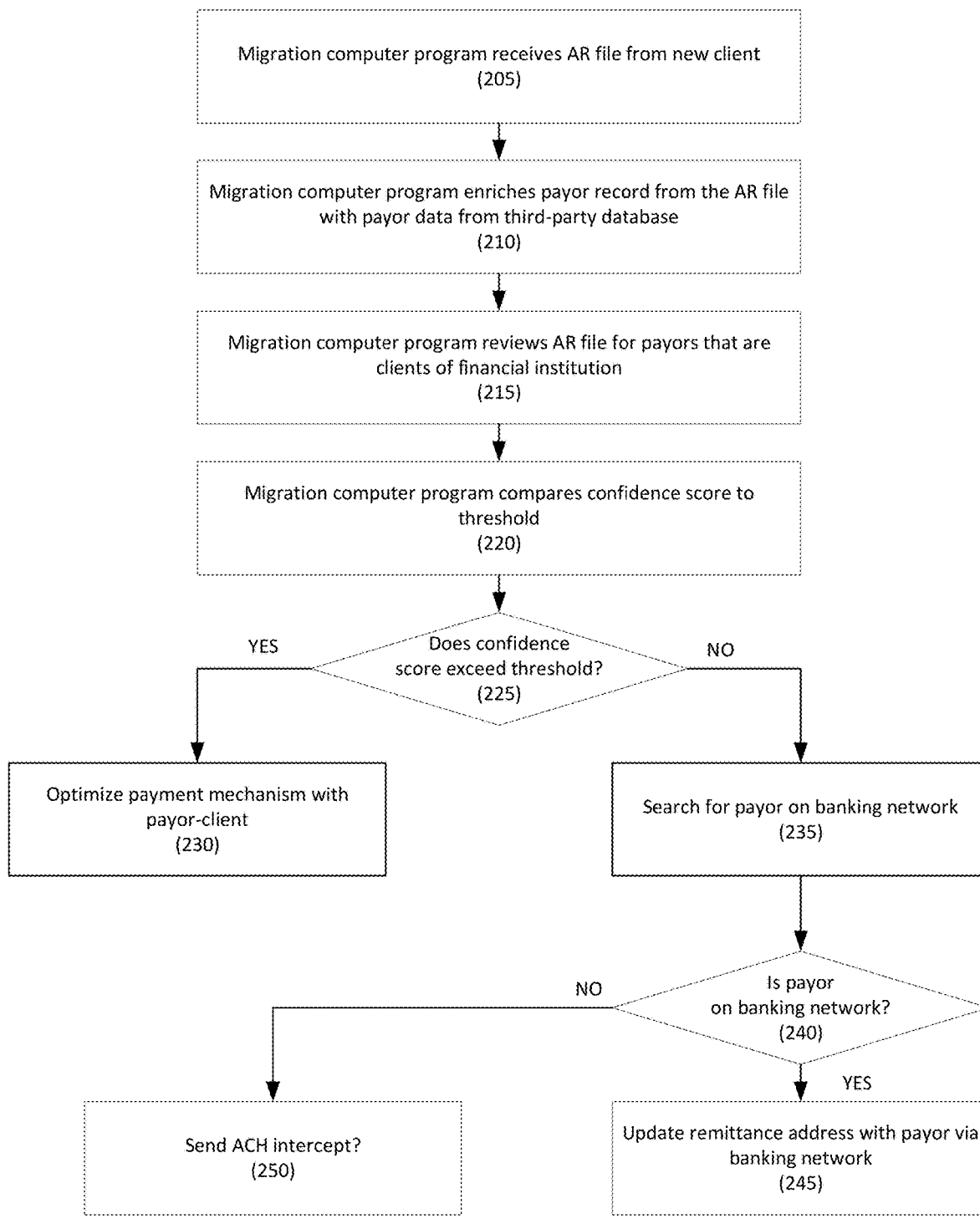
FIG. 2 depicts a method for automated account migration according to one embodiment.

Referring to FIG. 2, a method for automated account migration is disclosed according to an embodiment. In step 205, a migration computer program executed by a backend for a financial institution may receive an AR file from a client, which may be a new client. In one embodiment, the AR file may be an electronic file that may identify one or more incoming payments from one or more payor. In one embodiment, each incoming payment may identify the payor, payor contact information (e.g., address, phone number, email address, etc.), a payment amount, a payment date, and a payment account, etc.

In step 210, the migration computer program may enrich the payor record with payor data from one or more third-party database. In one embodiment, the migration computer program may use the payor data to augment or enrich the data in the AR file and to provide any missing information. For example, if the payor name and email address is known, the migration computer program may find a match for the payor name and email address in the third-party database and enrich the payor information with address information for the payor from the third-party database.

In one embodiment, the migration computer program may query other financial institutions for payor information. For example, using a network, such as Liink, the migration computer program may query other financial institutions for any missing payor information, banking information for the payor (e.g., does the payor have an account with another financial institution that participates in the banking network, etc.).

In step 215, the migration computer program may review each incoming payment to identify payor(s) that may be clients of the financial institution. In one embodiment, "brute force" matching may be used to match the payors in the AR file with clients of the financial institution.

In one embodiment, the migration computer program may use a scoring engine to provide a confidence score for any potential matches. For example, the scoring engine may identify fields in the payor record from the AR file and fields in the financial institution client records that match and do not match, may assign a weighting to the matches and non-matches, and may output a confidence score based on the weighted scores for the matches. Each field that may match or may not match may be assigned a different weight. For example, a match may be given a score of 1, a non-match a score of 0, and a missing field may be assigned a score of 0.5. It should be understood that these values are exemplary only; other values may be used as is necessary and/or desired. The weightings may be based on the importance of a match (e.g., a name match may be weighted more heavily than a phone number match), and may be set by default, may be configured, or may be set using machine learning.

In one embodiment, the scoring engine may further consider the degree by which the records do not match. For example, a minor spelling difference may be assigned a score close to a matching score, whereas a phone number that differs by area code but otherwise matches may be assigned a score close to non-match.

In one embodiment, machine learning may be used to set the weightings based on a history of match success. For example, if the address field is historically a good indicator of a match, the machine learning engine may assign a higher weight to address matches.

In step 220, the migration computer program may compare the confidence score to a threshold to determine whether the payor is likely to be a client of the financial institution. In one embodiment, the threshold may be a default value, may be configurable, or may be set by a trained machine learning algorithm using historical data.

If, in step 225, the confidence score exceeds the threshold, in step 230, the migration computer program may optimize the payment mechanism for the incoming payment. For example, the payment may be optimized to be from the payor's account with the financial institution to the new client's account with the financial institution.

In one embodiment, the migration computer program may request a different, more efficient and/or less costly payment mechanism from the payor.

If, in step 225, the confidence score does not exceed the threshold, in step 235, the migration computer program may search for the payor on a multi-bank banking network, such as the Liink network. If, in step 240, the migration computer program identifies the payor on the banking network, in step 245, the migration computer program may update the remittance address with the payor over the banking network.

In one embodiment, the migration computer program may request that the new client confirms the payor matches as is necessary and/or desired. In another embodiment, the migration computer program may present potential matches to the new client, and the new client may identify the payor.

If the migration computer program cannot identify the payor on the banking network, in step 250, the migration computer program may execute an intercept, such as an ACH intercept, intercept the payment from the payor to the new client's account with its former financial institution and re-route it to the new client's account with the financial institution.

In one embodiment, the new client may confirm the ACH intercept before the ACH is executed. For example, the migration computer program may present a message to the new client asking for authorization to execute the ACH intercept.

In one embodiment, once the payment is made, the payment may be transferred to any other account as is necessary and/or desired. For example, once received in the new client's account, the payment may be sent to any other account identified by the new client. Thus, the new client may only need to enroll once time regardless of whether the new client changes financial institutions at a later date.

In another embodiment, a client may acquire AR from another client. The migration computer program may identify the payors in the acquired client's AR file, and may communicate information for the payors to update their payment address from the acquired client's financial institution to the client's financial institution. The migration computer program may identify payors having accounts with the client's financial institution and may update the payee address with the payors automatically, including identifying other payment mechanisms that may reduce friction and cost. For payors that are not customers of the client's financial institution, the migration program may communicate a file to facilitate the change.

Although several embodiments have been disclosed, it should be recognized that these embodiments are not exclusive to each other, and certain elements or features from one embodiment may be used with another embodiment.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communication technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated account migration, comprising:
    receiving, by a migration computer program executed by a backend for a financial institution comprising a computer processor, an accounts receivable file, wherein the accounts receivable file is an electronic file and comprises one or more incoming payments from a first client;
    identifying, by the migration computer program, a payor for each incoming payment, each payor having a payor record;
    enriching, by the migration computer program, the payor record with third-party payor information from a third-party database;
    identifying, by the migration computer program, a second client of the financial institution in a client database that is potentially the payor, the client database comprising a plurality of client records;
    generating, by the migration computer program, a confidence score for the second client using a scoring engine, wherein generating the confidence score for the second client includes:
        identifying, by the scoring engine, a match or a non-match to each payor data field in the payor record to a client data field in one of the plurality of client records;
        assigning, by the scoring engine, a score to each match or each non-match;
        generating, by a machine learning engine, an assigned weight for each score;
        assigning, by the scoring engine, the assigned weight for each score to its corresponding score;
        weighting, by the scoring engine, each score using the assigned weight; and
        calculating, by the scoring engine, the confidence score based on the weighted scores;
    associating, by the migration computer program, the payor with the second client in response to the confidence score being above a threshold;
    identifying, by the migration computer program, a payment mechanism for payment for a payor account to an account for the first client with the financial institution;
    implementing, by the migration computer program, the payment mechanism;
    determining that at least one of the one or more incoming payments identifies a former account for the first client; and
    in response to the determination, executing an intercept to re-route the at least one incoming payment to a current account for the first client.

2. The method of claim 1, wherein enriching the payor record with the third-party payor information from the third-party database comprises:
    identifying, by the migration computer program, the payor in the third-party database;
    retrieving, by the migration computer program, the third-party payor information for the payor from the third-party database; and
    updating, by the migration computer program, the payor record with at least some of the third-party payor information.

3. The method of claim 1, wherein the third-party database comprises a commercial database.

4. The method of claim 1, wherein each assigned weight is set based on historical data.

5. The method of claim 1, wherein the threshold is set using the machine learning engine.

6. The method of claim 1, wherein identifying the payment mechanism for payment for the payor account to the account for the first client with the financial institution comprises:
    requesting, by the migration computer program, authorization from the payor for the payment mechanism.

7. The method of claim 1, wherein the third-party database comprises a third-party financial institution database in a financial institution network.

8. The method of claim 1, wherein implementing, by the migration computer program, the payment mechanism comprises:
    communicating, by the migration computer program and over a banking network, the payment mechanism to the payor.

9. A backend electronic device for a financial institution comprising:
    a memory storing a migration computer program; and
    a computer processor;
    wherein, when executed by the computer processor, the migration computer program causes the computer processor to:
        receive an accounts receivable file, wherein the accounts receivable file is an electronic file and comprises one or more incoming payments from a first client;
        identify a payor for each incoming payment, each payor having a payor record;
        enrich the payor record with third-party payor information from a third-party database;
        identify a second client of the financial institution in a client database that is potentially the payor, the client database comprising a plurality of client records;
        generate a confidence score for the second client using a scoring engine, wherein the migration computer program generates the confidence score for the second client by causing the computer processor to:
            identify a match or a non-match to each payor data field in the payor record to a client data field in one of the plurality of client records;
            assign a score to each match or each non-match;
            generate, with a machine learning engine, an assigned weight for each score;
            assign the assigned weight for each score to its corresponding score;
            weight each score using the assigned weight; and calculate the confidence score based on the weighted scores;

associate the payor with the second client in response to the confidence score being above a threshold;

identify an payment mechanism for payment for a payor account to an account for the first client with the financial institution;

implement the payment mechanism;

determine that at least one of the one or more incoming payments identifies a former account for the first client; and in response to the determination, execute an intercept to re-route the at least one incoming payment to a current account for the first client.

10. The electronic device of claim 9, wherein the migration computer program enriches the payor record with the third-party payor information from the third-party database by causing the computer processor to:

identify the payor in the third-party database;

retrieve the third-party payor information from the third-party database; and update the payor record with at least some of the third-party payor information.

11. The electronic device of claim 9, wherein the third-party database comprises a commercial database.

12. The electronic device of claim 9, wherein each assigned weight is set based on historical data.

13. The electronic device of claim 9, wherein the threshold is set using the machine learning engine.

14. The electronic device of claim 9, wherein the migration computer program identifies the payment mechanism for payment for the payor account to the account for the first client with the financial institution by causing the computer processor to:

request authorization from the payor for the payment mechanism.

15. The electronic device of claim 9, wherein the third-party database comprises a third-party financial institution database in a financial institution network.

16. The electronic device of claim 9, wherein the migration computer program implements the payment mechanism by causing the computer processor to:

communicate, over a banking network, the payment mechanism to the payor.

* * * * *